US012650560B2

(12) United States Patent　　　　(10) Patent No.:　　US 12,650,560 B2
　　Theuerkorn　　　　　　　　　　　　(45) Date of Patent:　　　　Jun. 9, 2026

(54) FIBER OPTIC CONNECTORS HAVING ONE OR MORE OPTICAL TERMINALS

(71) Applicant: Corning Research & Development Corporation, Corning, NY (US)

(72) Inventor: Thomas Theuerkorn, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 663 days.

(21) Appl. No.: 18/072,013

(22) Filed: Nov. 30, 2022

(65) Prior Publication Data

US 2024/0103229 A1　　　Mar. 28, 2024

Related U.S. Application Data

(63) Continuation of application No. PCT/US2022/050855, filed on Nov. 23, 2022, and a continuation of application No. PCT/US2022/044997, filed on Sep. 28, 2022.

(51) Int. Cl.
　　*G02B 6/38*　　　　　(2006.01)
(52) U.S. Cl.
　　CPC ......... *G02B 6/3825* (2013.01); *G02B 6/3849* (2013.01); *G02B 6/3853* (2013.01); *G02B 6/3879* (2013.01); *G02B 6/3887* (2013.01); *G02B 6/389* (2013.01)

(58) Field of Classification Search
　　CPC .. G02B 6/3825; G02B 6/3849; G02B 6/3879; G02B 6/3887; G02B 6/389
　　See application file for complete search history.

(56) References Cited

U.S. PATENT DOCUMENTS

| | | | |
|---|---|---|---|
| 5,310,504 | A | 5/1994 | Ihm et al. |
| 5,520,553 | A | 5/1996 | Cecil et al. |
| 5,661,832 | A | 8/1997 | Yonemura |
| 6,471,418 | B1 | 10/2002 | Yamaguchi |

(Continued)

FOREIGN PATENT DOCUMENTS

| | | |
|---|---|---|
| EP | 0064619 A1 | 11/1982 |
| EP | 0716473 B1 | 4/2000 |

(Continued)

*Primary Examiner* — Chad H Smith
(74) *Attorney, Agent, or Firm* — Michael E. Carroll, Jr.

(57)　　　　ABSTRACT

Optical terminals and fiber optic connectors using optical terminals disposed within a connector housing are disclosed. The optical terminals allow strain-relieving a ferrule assembly to a fiber optic cable using a sleeve for quick and easy assembly of the connector. The connector may also include a boot received into the connector housing. The connector may also have an outer housing with a transverse wall at the rear end for providing a ferrule assembly position assurance when the outer housing is properly attached to the optically mated fiber optic connector. Connectors may use fiber-based or lens-based optical interfaces along with other optional features such as sealing gasket disposed on the ferrule assembly to protect when mated, a sealing membrane disposed on a front opening of the connector housing for inhibiting moisture, dirt, debris or dust from reaching the optical interface prior to optical mating.

40 Claims, 9 Drawing Sheets

(56)                References Cited

U.S. PATENT DOCUMENTS

| | | | |
|---|---|---|---|
| 6,579,014 B2 | 6/2003 | Melton et al. | |
| 6,685,361 B1 | 2/2004 | Rubino et al. | |
| 6,817,781 B2 | 11/2004 | Ide | |
| 6,893,161 B2 | 5/2005 | Nakura | |
| 6,935,790 B2 | 8/2005 | Ozaki | |
| 6,935,893 B1 | 8/2005 | Flowers et al. | |
| 6,945,704 B2 | 9/2005 | Yamaguchi | |
| 7,380,991 B2 | 6/2008 | Schempp | |
| 7,553,090 B2 | 6/2009 | Schempp et al. | |
| 7,621,676 B2 | 11/2009 | Nakagawa et al. | |
| 7,637,671 B2 | 12/2009 | Schempp | |
| 7,665,907 B2 | 2/2010 | Schempp et al. | |
| 7,708,474 B2 | 5/2010 | Sheau Tung Wong et al. | |
| 7,798,727 B2 | 9/2010 | Sheau Tung Wong et al. | |
| 7,963,705 B2 | 6/2011 | Staeber et al. | |
| 8,628,253 B2 | 1/2014 | Bitter et al. | |
| 8,905,649 B2* | 12/2014 | Enomoto | G02B 6/3869 385/75 |
| 8,998,503 B2 | 4/2015 | Barnette, Jr. et al. | |
| 9,028,154 B2 | 5/2015 | Hui et al. | |
| 9,207,407 B2 | 12/2015 | Barnette et al. | |
| 9,304,266 B2 | 4/2016 | Chan | |
| 9,325,114 B2 | 4/2016 | Miklinski et al. | |
| 9,411,110 B2 | 8/2016 | Barnette, Jr. et al. | |
| 9,625,659 B2 | 4/2017 | Hikosaka | |
| 9,645,324 B2 | 5/2017 | Hikosaka | |
| 9,831,601 B2 | 11/2017 | Kim | |
| 10,234,635 B1 | 3/2019 | Fabian et al. | |
| 10,537,255 B2 | 1/2020 | Eberle et al. | |
| 11,054,585 B2 | 7/2021 | Hikosaka | |
| 11,086,086 B2 | 8/2021 | Hikosaka | |
| 11,249,259 B2 | 2/2022 | Hu et al. | |
| 2004/0101251 A1 | 5/2004 | Rahrig et al. | |
| 2004/0264880 A1 | 12/2004 | Miller et al. | |
| 2009/0247011 A1 | 10/2009 | Myer et al. | |
| 2010/0284656 A1 | 11/2010 | Morra et al. | |
| 2013/0094814 A1 | 4/2013 | Ishida et al. | |
| 2013/0266270 A1 | 10/2013 | Hikosaka et al. | |
| 2014/0205245 A1* | 7/2014 | Gallegos | G02B 6/38875 385/81 |
| 2015/0378111 A1 | 12/2015 | Hikosaka | |
| 2018/0301842 A1 | 10/2018 | Somanathapura Ramanna | |
| 2019/0377139 A1* | 12/2019 | Chang | G02B 6/3898 |
| 2021/0239918 A1 | 8/2021 | Lefebvre et al. | |
| 2022/0006229 A1 | 1/2022 | Carlson et al. | |
| 2022/0252796 A1* | 8/2022 | Li | G02B 6/3891 |

FOREIGN PATENT DOCUMENTS

| | | |
|---|---|---|
| EP | 1491925 A1 | 12/2004 |
| EP | 2615482 A1 | 7/2013 |
| EP | 2659300 A1 | 11/2013 |
| EP | 3514589 A1 | 7/2019 |
| EP | 3369144 B1 | 8/2021 |
| JP | 2010-054681 A | 3/2010 |
| JP | 2015-055731 A | 3/2015 |
| WO | 2004/051346 A1 | 6/2004 |
| WO | 2009/120283 A2 | 10/2009 |
| WO | 2011/149042 A1 | 12/2011 |
| WO | 2012/056908 A1 | 5/2012 |
| WO | 2014/021231 A1 | 2/2014 |
| WO | 2014/196538 A1 | 12/2014 |
| WO | 2020/102463 A1 | 5/2020 |

* cited by examiner

FIBER OPTIC CONNECTORS HAVING ONE OR MORE OPTICAL TERMINALS

CROSS-REFERENCES TO RELATED APPLICATIONS

This application claims the benefit of priority of International Application No. PCT/US22/44997 filed on Sep. 28, 2022, and International Application No. PCT/US22/50855 filed on Nov. 23, 2022, the content of which are relied upon and both incorporated herein by reference in their entirety.

FIELD

The disclosure is directed to optical terminals and fiber optic connectors using one or more optical terminals received into a connector housing. The optical terminal and connector designs using the optical terminals allow easy assembly or removal of the optical terminals from the outer housing for assembly and as may be needed for service.

BACKGROUND

Optical fiber is increasingly being used for a variety of applications, including but not limited to broadband voice, video, and data transmission in a variety of new and expanding applications. As bandwidth demands increase optical fiber is migrating deeper into new communication networks such as fiber for in-vehicle optical networks and the like. As optical fiber extends deeper into these communication networks there exist a need for quickly and easily making optical connections in a quick and easy manner while meeting the environmental and other demands for these emerging applications.

Fiber optic connectors were developed for making one or more plug and play optical connections using a suitable fiber optic connector for the given application. Fiber optic connectors provide a node for mating and unmating in the optical network and provide the flexibility of locating the connection points in convenient locations for efficient network assembly, access, design and/or deployment. Conventional fiber optic connectors used for telecommunications, are used indoors or inside enclosures for inhibiting moisture, dust, dirt or debris or the like from reaching the mating interface of the fiber optic connector. Hardened fiber optic connectors were developed for outdoor applications that for inhibiting moisture, dust, dirt or debris or the like from reaching the mating interface of the fiber optic connector. However, these hardened fiber optic connectors developed for outdoor applications are relatively large, bulky and/or expensive.

As new applications emerge for the deployment of optical networks the requirements for these new applications may be different and/or have other considerations for the given application. One such emerging application is the use of optical systems on vehicles that present a new environment with specific challenges for successful deployment in a harsh environment while requiring a relatively compact footprint in a robust and reliable package while enabling inspection and serviceability, ease of manufacture and the like. Consequently, there exists an unresolved need for robust fiber optic connectors with a robust design for preserving optical performance, providing flexibility for assembly, and the ability to inspect and service the fiber optical connector.

SUMMARY

The disclosure is directed to optical terminals and fiber optic connectors having optical terminals. The optical terminals advantageously are a separate unit or sub-assembly and strain-relieve a ferrule assembly to a fiber optic cable using a sleeve, thereby providing quick and easy assembly. Further, the optical terminals provide a robust modular package using a variety of optical interfaces that may be used to construct fiber optic connectors using various connector housings, connector packages or designs. Fiber optic connectors may also include a boot received into a connector housing that cooperates with the optical terminal by permitting a portion of the sleeve to fit into a boot passageway. The disclosed optical terminal and related connector concepts are advantageous since they provide a fiber optic connector having a compact, robust and reliable fiber optic connector package that also enables serviceability, ease of assembly and the like. The fiber optic connector using the optical terminals may also comprise other components such as an outer housing that is removable and/or re-installable about the connector housing.

The optical terminal advantageously inhibit the relative movement between the ferrule assembly and the fiber optic cable for providing a robust package that can operate over a wide temperature range using a proper fiber optic cable. The optical terminals or fiber optic connectors disclosed provide a simple design that may also use other features if desired. For instance, the connector concepts may allow keying of individual connectors as desired for applications such as automotive applications or the like that may desire to exclude incorrect connections during assembly.

One aspect of the disclosure is directed to fiber optic connectors comprising a ferrule assembly, a fiber optic cable, a connector housing, a sleeve for strain relieving the ferrule assembly to the fiber optic cable to form an optical terminal, a boot and an outer housing. The ferrule assembly comprises a bore extending from a rear end into the ferrule assembly and an optical interface disposed at a front end of the ferrule assembly, and a fiber optic cable comprising an optical fiber and a jacket, and the optical fiber is disposed within the bore of the ferrule assembly. Connector housing comprises a passageway extending from a rear end to a front end and the ferrule assembly is at least partially disposed within the passageway when assembled. A first portion of the sleeve is attached to the ferrule assembly and a second portion of the sleeve attached to the fiber optic cable for forming an optical terminal. The boot comprises a front end sized for fitting into the respective passageway of the connector housing along with a boot passageway sized for receiving a portion of the sleeve.

Another aspect of the disclosure is directed to fiber optic connectors a ferrule attached to a ferrule holder to form a ferrule assembly, a fiber optic cable, a connector housing, a sleeve for strain relieving the ferrule assembly to the fiber optic cable to form an optical terminal, a boot and an outer housing. The ferrule comprises a bore extending from a rear end into the ferrule and an optical interface disposed at a front end of the ferrule, and the ferrule holder has a forward portion and a rearward portion with a shoulder disposed between the forward portion and the rearward portion. The fiber optic cable comprises an optical fiber and a jacket with the optical fiber disposed within the bore of the ferrule. The fiber optic connectors also include a connector housing having a passageway extending from a rear end to a front end and the ferrule assembly is at least partially disposed within the passageway when assembled. A first portion of the sleeve is attached to the ferrule assembly and a second portion of the sleeve attached to the fiber optic cable for forming an optical terminal. The boot comprises a front end sized for fitting into the respective passageway of the connector housing along with a boot passageway sized for receiving a portion of the sleeve. The rear end of the outer housing comprises a transverse wall for inhibiting the at least one ferrule assembly from being displaced from the passageway of the connector housing.

Another aspect of the disclosure is directed to an optical terminal comprising a ferrule attached to a ferrule holder to form a ferrule assembly, a fiber optic cable and a sleeve for strain relieving the ferrule assembly to the fiber optic cable. The ferrule comprises a bore extending from a rear end into the ferrule and an optical interface disposed at a front end of the ferrule, and the ferrule holder comprises a forward portion and a rearward portion with a shoulder disposed between the forward portion and the rearward portion. The fiber optic cable comprises an optical fiber and a jacket with the optical fiber disposed within the bore of the ferrule. A first portion of the sleeve is attached to the ferrule assembly and a second portion of the sleeve attached to the fiber optic cable for forming an optical terminal.

Still other aspects of the disclosure are directed to a method of making fiber optic connectors. The methods of making comprising assembling a ferrule into a ferrule holder to form a ferrule assembly where the ferrule comprises a bore extending from a rear end into the ferrule and an optical interface disposed at a front end of the ferrule, and a fiber optic cable comprising an optical fiber and jacket where the optical fiber is placed within the bore of the ferrule. The method includes inserting the ferrule assembly into a passageway of a connector housing extending from a rear end to a front end so that the ferrule assembly is at least partially disposed within the passageway. A sleeve strain relieves the ferrule assembly to the fiber optic cable where a first portion of the sleeve is attached to the ferrule assembly and a second portion of the sleeve attached to the fiber optic cable for forming an optical terminal. A boot comprising a front end sized for fitting into the passageway of the connector housing is inserted into the connector housing so that a boot passageway receives a portion of the sleeve, and placing an outer housing about the connector housing. The method may have other steps or features such as the rear end of the outer housing having a transverse wall for inhibiting the at least one ferrule assembly from being displaced from the passageway of the connector housing.

Many variations using the fiber optic connector concepts disclosed are possible. For instance, the fiber optic connectors may use a single ferrule assembly or fiber optic connectors may include multiple ferrule assemblies such as configured as a duplex connector or other configurations as desired. Additionally, the ferrule assembly of the fiber optic connector may be configured for physical contact or a lens-based optical transmission as desired.

Still other variations are possible for making a robust fiber optic connector. By way of explanation, the fiber optic connectors may further include a sealing gasket disposed within a passageway of the connector housing for providing an internal sealing cavity within the passageway of the fiber optic connectors when mated if desired, thereby providing environmental protection within the passageway of the connector housing that houses the optical interface.

The disclosed connector concepts also allow quick and easy manufacture and assembly of the connector in a reliable, modular and configurable connector package. Additionally, the fiber optic connectors disclosed may be a portion of a cable assembly used in a vehicle or other applications.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figure 1:
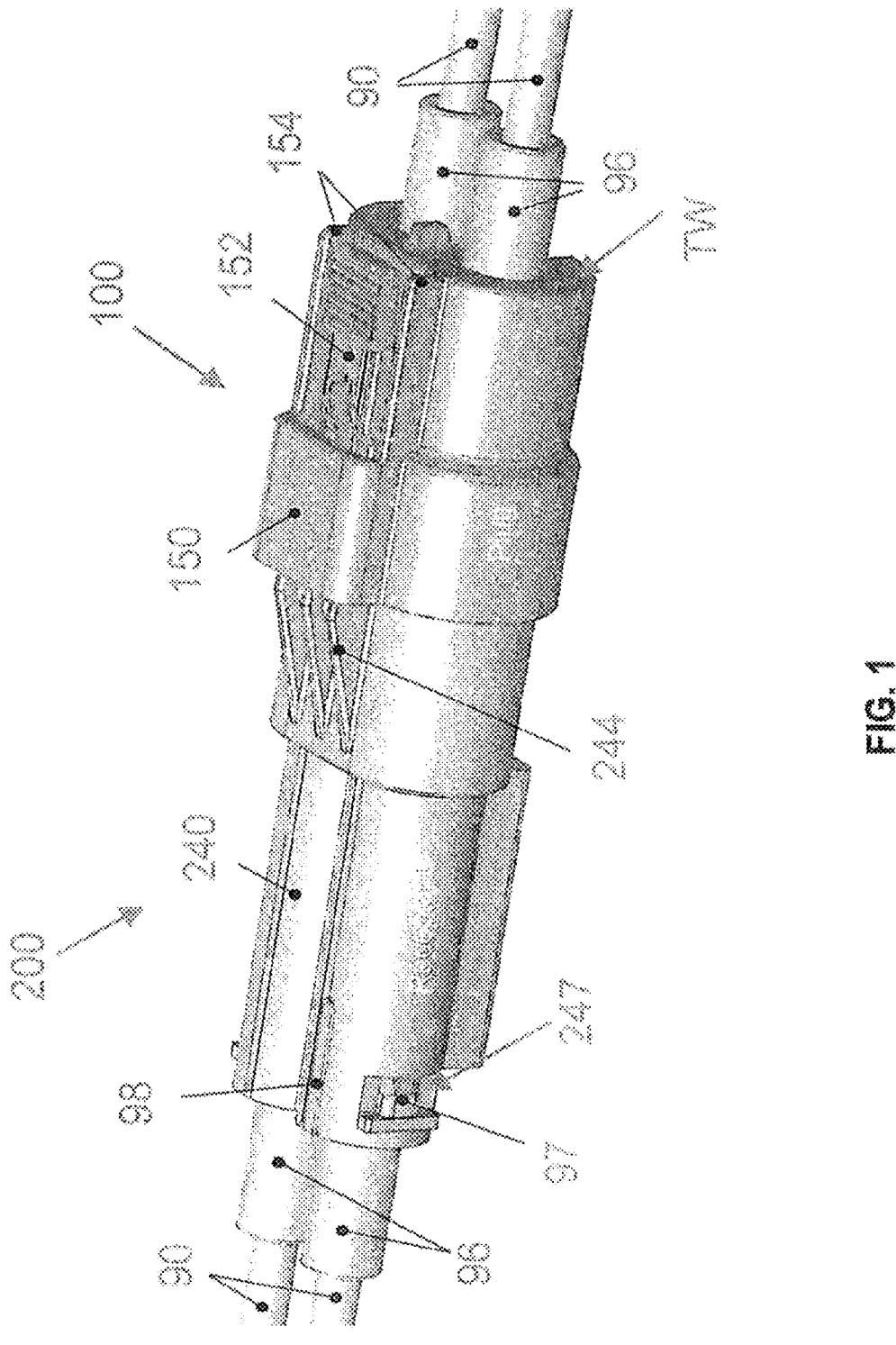
FIG. 1 is a top perspective view of an optical mating of cable assemblies having explanatory fiber optic connectors configured as a male plug that is mated to a fiber optic connector configured as a female receptacle with the male plug connector having an outer housing with a longitudinal open slot disposed on the bottom of the outer housing (not visible)

Reference will now be made in detail to the embodiments of the disclosure, examples of which are illustrated in the accompanying drawings. Whenever possible, like reference numbers will be used to refer to like components or parts.

The concepts disclosed are related to optical terminals and fiber optic connectors (hereinafter "connectors") using optical terminals. The optical terminals strain-relieve a ferrule assembly to a fiber optic cable using a sleeve. The optical terminals are modular and may be received within a passageway of a connector housing for making a connector. The disclosed connectors ease assembly and provide a robust connector suitable for applications that may be exposed to the environment such as large temperature variations, moisture, dirt, dust, debris or the like. Suitable applications may include communication systems for vehicles using on-board optical systems such as automotive applications, trucks, motorcycles, aerospace, farm equipment, ships or the like, but other applications are possible for concepts disclosed. The connectors disclosed comprise a ferrule assembly with an optical fiber of a fiber optic cable disposed in the bore of the ferrule assembly. The sleeve is used for strain-relieving the ferrule assembly to the fiber optic cable by attaching a first portion of the sleeve to the ferrule assembly and a second portion of the sleeve is attached to the fiber optic cable for creating the optical terminal. The optical terminals are advantageous since they inhibit optical fiber buckling, thereby making the assemblies advantageous for use in outdoor applications having wide temperature ranges.

Connectors using the optical terminals may include any suitable construction or features as desired. By way of example, a connector may include an outer housing of any suitable configuration. For instance, the outer housing may comprise a longitudinal open slot disposed along the length extending from a rear end to a front end on a first side and a latching trigger disposed on a second side of the outer housing. The longitudinal open slot of the outer housing allows easy assembly, removal and/or replacement of the outer housing onto the connector housing of the cable assembly as needed. Flexibility in the installation during assembly or removal of the outer housing from the connector advantageously simplifies assembly of the connector as well as enabling inspection or service as needed. The outer housing may also provide position assurance for one or more ferrule assemblies of the connector. For instance, a transverse wall near the rear end of the outer housing can provide optical terminal position assurance (OTPA) when the outer housing is properly attached to the fiber optic connector.

The connectors may also optionally comprise other features for maintaining cleanliness of the optical interface of the connector before or after mating as desired. For instance, a sealing membrane may be disposed on the front opening of the connector housing for keeping the optical interface of the connector clean until mating of the connector is required. Thus, the sealing membrane is advantageous for cleanliness before optical mating such as during assembly of wiring harness using the connector to protect the optical interface. Additionally, the connector may advantageously provide environmental protection or cleanliness for the optical interface after being mated by using one or more sealing gaskets as desired. For instance, the sealing gasket(s) may be disposed on the ferrule assembly so that the sealing gasket provides environmental protection when the connector is optically mated with a suitable device such as a complimentary connector, transceiver or other suitable device. When assembled, the sealing gasket is disposed within a passageway of the connector housing, and should not be confused with seals disposed on the outer surface of the connector housing. Instead, locating the sealing gasket on the ferrule assembly within the connector housing provides an internal sealing cavity for the optical mating within the passageway of the connector housing, thereby providing environmental protection when connector is in the mated state. The connector concepts using the optical terminals also allow quick and easy manufacture and assembly of the connector in a reliable, modular and configurable connector package.

The connector concepts using the optical terminals or other features may be used with ferrule assemblies having an optical interface that uses physical contact between optical fibers or using lenses for optical mating as desired. As used herein, the term "ferrule assembly" may comprise a single component or multiple components. By way of example, the optical terminals may have a ferrule assembly formed as a single molded component if desired or formed from multiple components such as a ferrule holder with a ferrule.

The connector concepts disclosed may be used as part of a larger wiring harness or device. For instance, the connector may be constructed as a portion of a larger wiring harnesses or sub-assembly built by a contractor for future installation into vehicles or other devices during the manufacturing process.

Of course, the concepts disclosed may be used in other applications such as in-home networks or the like. For instance, the concepts disclosed herein may also be suitable for fiber optic networks such as for Fiber-to-the-location (FTTx) and 5G applications, and are equally applicable to other optical applications as well including indoor, industrial, wireless, or other suitable applications. Additionally, the concepts disclosed may be used with fiber optic connectors having any suitable footprint, configuration or construction. Reference to "forward", "front", "rearward" and "rear", "top" or "bottom" as used herein are relative terms that generally relate to the orientation of the fiber optic connector where the front or forward portion is with respect to the direction of the mating end of the fiber optic connector or component(s) and the rear or rearward portion is with respect to the direction of the portion of the fiber optic connector where the fiber optic cable is first inserted into the fiber optic connector or component(s). Various components or structures are described in this disclosure as being forward or rearward relative to one another. Various designs, constructions, or features for fiber optic connectors are disclosed in more detail with respect to explanatory embodiments as discussed herein and may be modified or varied as desired.

Figure 2:
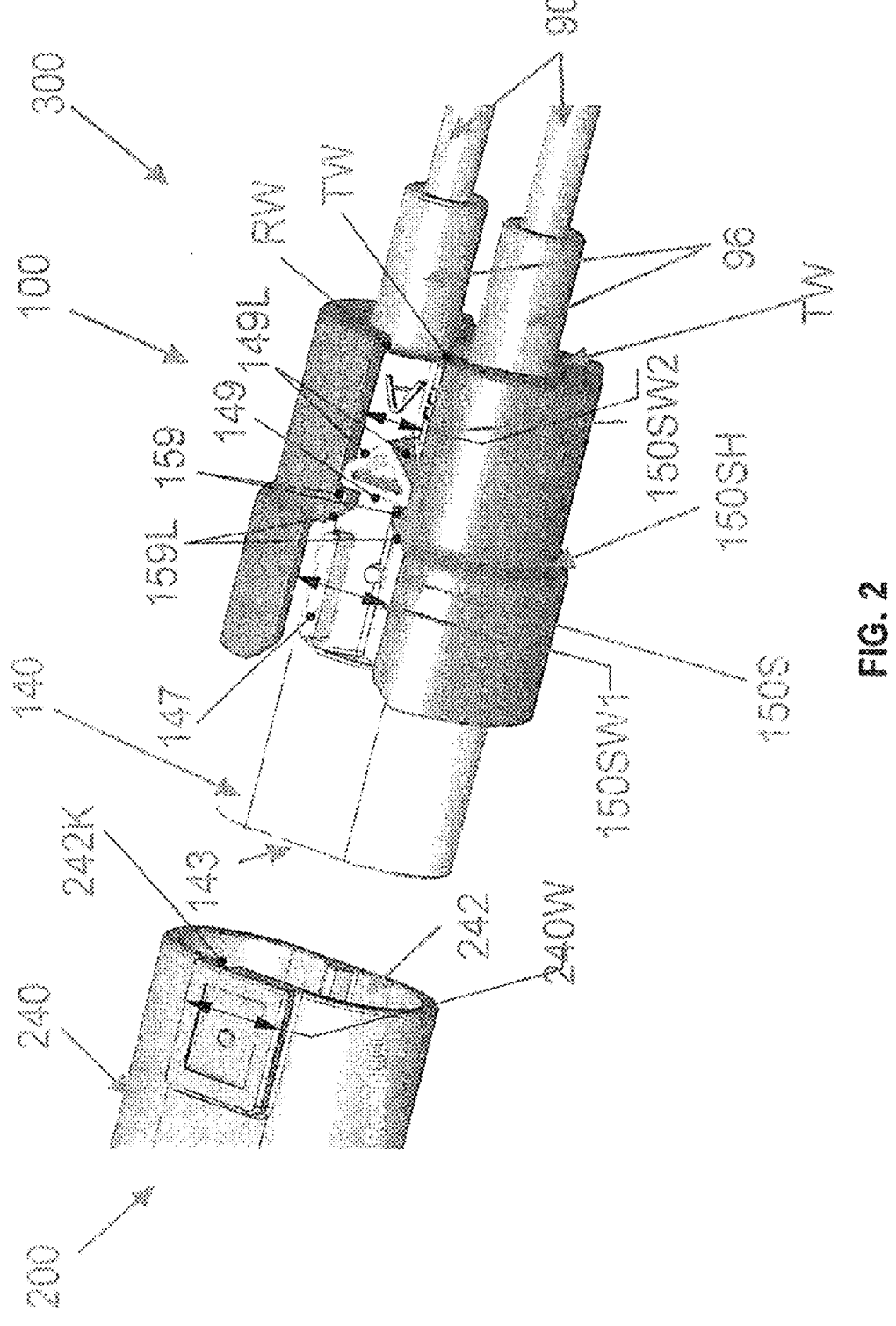
FIG. 2 is a bottom perspective view of unplugging of the fiber optic plug of FIG. 1 showing details of the longitudinal open slot disposed on the bottom of the outer housing along with the latch features disposed in the longitudinal open slot.

FIG. 1 is a top perspective view of an optical mating of a first cable assembly (not numbered) to a second cable assembly (not numbered) shown with explanatory connectors 100,200. Explanatory connectors 100,200 comprise respective optical terminals 105 for making the connectors. The first cable assembly on the right-side is terminated to one or more fiber optic cable(s) 90 with a connector 100 configured as a male plug that is optically mated to second cable assembly on the left-side and is terminated to fiber optic cable(s) 90 with a connector 200 configured as a female receptacle. A portion of connector 100 fits into a passageway 242 of connector 200 for optical mating as shown by FIG. 2 where the connector 100 is unplugged from connector 200 as viewed from the bottom side of the connectors and cable assembly 300. Passageway 242 may also include a keying portion 242K as depicted. Although, the concepts will be explained with respect to connector 100 similar optical terminals 105 may be used for connector 200 as well.

As shown in FIGS. 1 and 2, explanatory connectors 100,200 are duplex connectors with each connector 100,200 having two optical terminals 105. When assembled, each ferrule assembly 60 of the respective optical terminal is at least partially disposed within the respective connector housings 140,240. The connector concepts may be used with any suitable number of optical terminals 105. For instance, duplex connectors may use connector housings 140,240 having furcated passageways 142,242 (i.e., a first passageway and a second passageway) aligned side-by-side for receiving respective optical terminals 105 with respective ferrule assemblies 60 terminated to the fiber optic cable 90.

Figure 3:
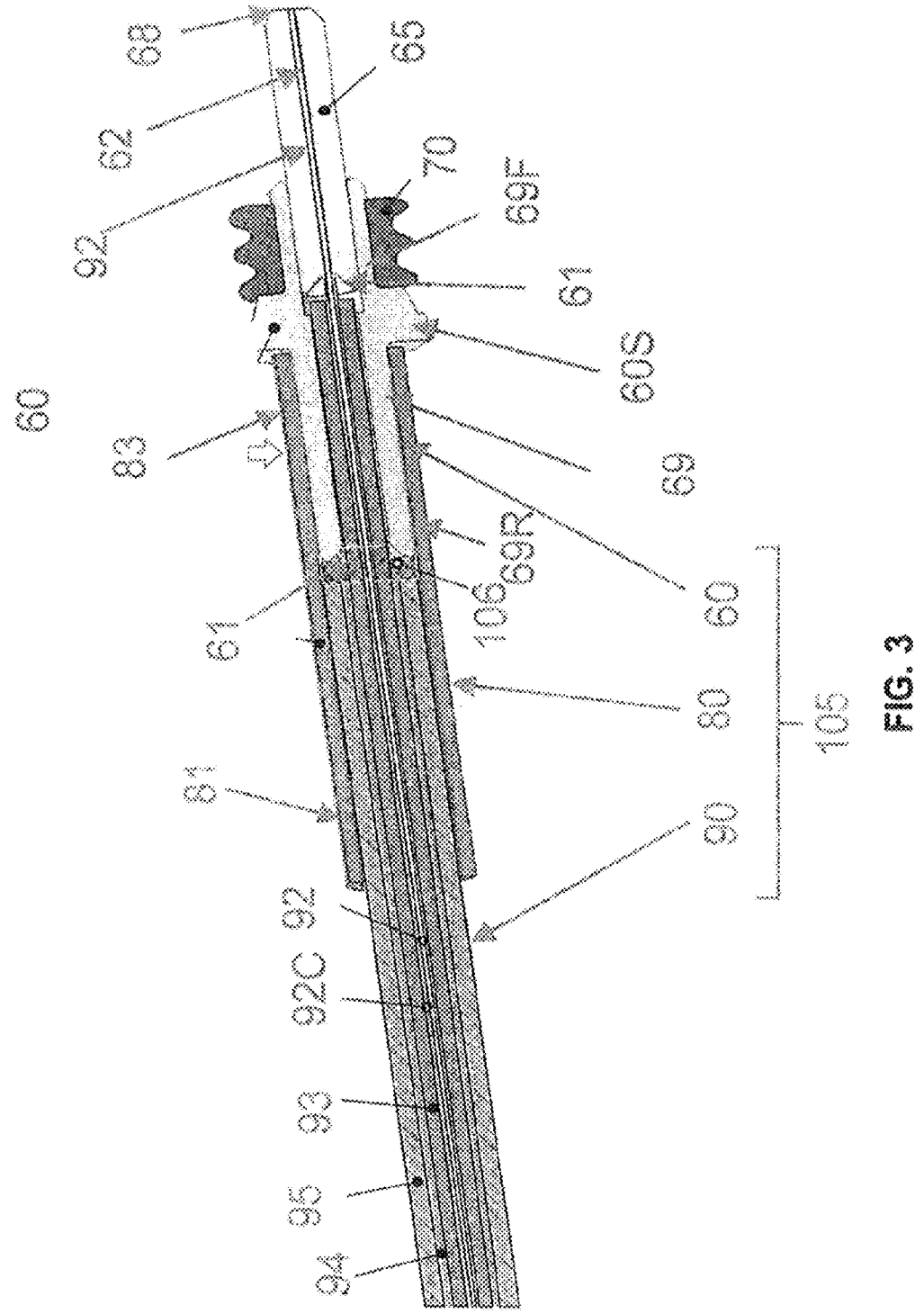
FIG. 3 is a perspective view of an explanatory optical terminal for use in the fiber optic connectors of FIG. 1.

As best shown in FIG. 3, optical terminals 105 comprise ferrule assembly 60, a sleeve 80 and an optical cable 90 that form a sub-assembly for use with connectors or other structures. Optical terminal 105 uses the sleeve 80 for strain-relieving the respective ferrule assembly 60 to the fiber optic cable 90 for inhibiting relative movement between the ferrule assembly 60 and fiber optic cable 90, thereby forming a robust optical terminal 105. An optional sealing gasket 70 is shown disposed on ferrule assembly 60 of optical terminal 105.

The sleeve 80 of optical terminal 105 may be any suitable material for the desired attachment to ferrule assembly 60 and fiber optic cable 90. For instance, sleeve 80 may be a brass sleeve that is crimped about respective ends of the ferrule assembly 60 and the fiber optic cable 90 for attachment. Alternatively, sleeve 80 may be formed from a polymer or other material and use an adhesive at the respective ends of the ferrule assembly and the fiber optic cable for attachment. Other materials for sleeve 80 or methods of attachment may be used as well for making optical terminal 105.

Optical terminals 105 advantageously forms a unit where the ferrule assembly 60 (e.g., ferrule) and the end of optical cable 90 move together (i.e., no substantial relative movement therebetween) since they are both fixed or attached to sleeve 80. The absence of relative motion between the ferrule assembly 60 and cable 90 allows the assembly to have a cavity 106 with a relatively small length between the rear end 61 of the ferrule assembly 60 and the front end of the jacket 95 of fiber optic cable 90. By way of example, and not limitation, the cavity 106 may have a length between the ferrule assembly 60 and the front end of jacket 95 that is 5 millimeters or less, in other examples the length of the cavity 106 is 2 millimeters or less. Thus, the optical fiber 92 is nearly fully-supported along its length for inhibiting buckling of the optical fiber 92 and causing undue attenuation due to environmental conditions such as large temperature variations or the like. By way of the example, the construction of the optical terminal 105 or connector advantageously inhibits undue optical attenuation or cable shrink back in the optical terminal over a temperature range of −40 to 150 C for preserving optical performance in harsh weather.

Figure 4:
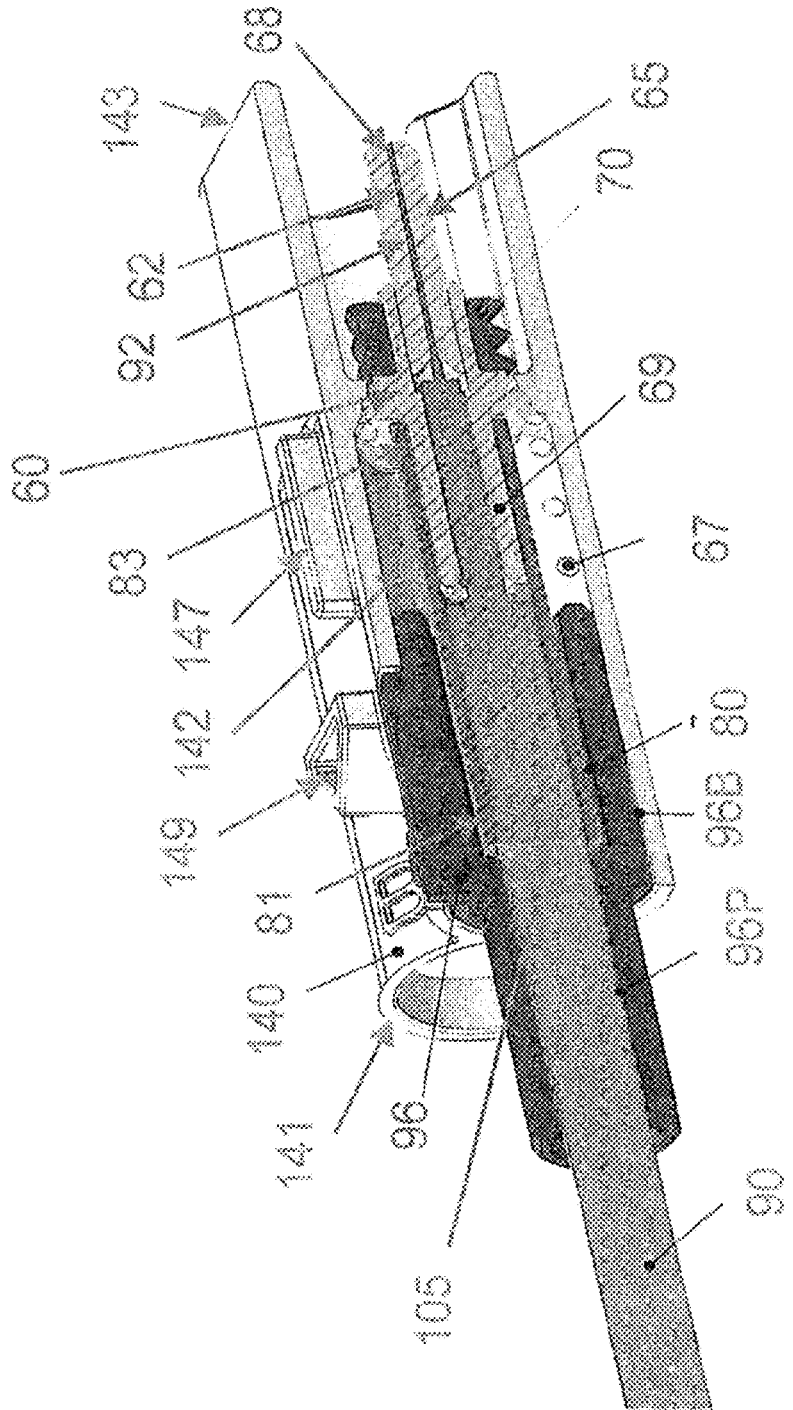
FIG. 4 is a cross-sectional view of the optical terminal of FIG. 3 after being assembled into the connector housing of the male plug connector of FIG. 1.

To make optical terminal 105, sleeve 80 may be slid onto a portion of the fiber optic cable 90 and the optical fiber 92 is inserted within the bore 62 of the ferrule assembly 60. As depicted, the sleeve 80 is sized to fit over a rear end 61 of the ferrule assembly 60 and fit over a front end of the jacket 95 of fiber optic cable 90. The sleeve 80 may slid forward on the fiber optic cable 90 to position the sleeve 80 about the rear end 61 of the ferrule assembly 60 and the front portion of the fiber optic cable 90. Advantageously, a cavity 106 with a short length is disposed between the rear end 61 of the ferrule assembly 60 and the front portion of the fiber optic cable 90. Thereafter, the sleeve 80 may be deformed about the front portion of the fiber optic cable 90 and deformed about the rear portion of the ferrule assembly 60 or attached using an adhesives for securing the ferrule assembly 60 to the fiber optic cable 90. Polishing of the ferrule assembly, inspection or other assembly steps may be performed as desired. An optional sealing gasket 70 may be positioned about a forward portion of the ferrule assembly 60 forward of the shoulder 60S as depicted. As shown in FIG. 4, the optical terminal may be inserted into the rear end 141 of passageway 142 of the connector housing 140 so that the ferrule assembly is at least partially disposed within the respective passageway 142.

Any suitable fiber optic cable 90 may be used for making optical terminals 105. By way of example, a fiber optic cable 90 may include buffer layer 93 as an upcoating that protects the optical fiber 92 and its fiber coating 92C, along with a strength member 94 and jacket 95. Fiber optic cable 90 may be used for making an optical terminal 105 by terminating a single ferrule assembly 60. Alternatively, a zipcord cable 90 having a jacket 95 with two separable legs each having optical fiber 92 may be used for terminating two ferrule assemblies 60 with a single cable for making optical terminals 105.

When assembled, fiber optic cable 90 includes at least optical fiber 92 disposed within the bore 62 of the ferrule assembly 60. Optical fibers 92 may be any suitable optical fiber for transmitting optical signals and may include multimode or single-mode optical fibers, and other suitable optical fibers are possible according to the concepts disclosed. Likewise, optical fiber 92 may have any suitable size for the optical core, cladding or coating desired for the communication system. For instance, the optical fiber 92 may be an OM3 compliant fiber, but other suitable silica-based optical fibers are possible. Optical fiber 92 may be part of any suitable fiber optic cable such as a cable 90 having a buffer layer 93 for upsizing the fiber diameter and protecting the optical fiber such as a 500, 700 or 900 μm diameter. The buffered optical fiber 92,93 may be further protected by jacket 95. As depicted in FIG. 3, fiber optic cable may have strength members 94 such as an aramid yarn that is strain-relieved to the ferrule assembly 60 by capturing the ends of the strength members 94 between the sleeve 80 and ferrule assembly if desired, but the strength members 94 may be attached in other suitable ways. However, strength members 94 are not required for the fiber optic cable 90.

The outer diameter of the jacket 95 of fiber optic cable 90 is preferably sized to be about the same size as the diameter of the rear end of the ferrule assembly 60 or ferrule holder 69 so that a uniformly sized sleeve may be used. However, the sizes may be different and have an appropriately sized sleeve 80 for the respective ends 81,83 of sleeve 80. Fiber optic cable 90 may also include features such as ripcords or the like.

FIG. 4 depicts the explanatory optical terminal 105 assembled into connector housing 140. Connector housing 140 comprises a passageway 142 extending from a rear end 141 to a front end 143. When assembled, the ferrule assembly 60 is at least partially disposed within the passageway 142 and inserted from the rear end 141.

Connectors using other components or configurations may be used with the connector concepts disclosed. For instance, a boot 96 may be used for securing an optical terminal 105 within the respective passageway 142. Boot 96 may be formed from any suitable material such as an elastomer or a polymer. Boot 96 aids in inhibiting cable side-pull bending forces from causing undue optical attenuation for the connector 100. Boot 96 comprises a front end sized for fitting into the passageway 142 of the connector housing 140, and the boot passageway 96P is sized for receiving a portion of the sleeve 80.

Moreover, tailoring the clearance between relevant portions of the boot 96 and components such as the sleeve 80, fiber optic cable 90 and/or the connector housing 140 can preserve optical performance. For instance, providing the clearance between the outer diameter (OD) of the sleeve 80 and the corresponding inner diameter (ID) of the portion of the boot passageway 96P for the sleeve 80 so it is slightly greater than the clearance between the OD of the jacket 95 of the fiber optic cable 90 and the corresponding ID for the relevant portion of the boot passageway 96P that supports the fiber optic cable 90. Likewise, the mobility of components during side-pull forces on the fiber optic cable may also be tailored to reduce undue optical attenuation by selecting the clearances for the components. For instance, the clearances: (1) between the ID of the relevant portions of the boot passageway 96P and OD for the jacket 95 of the fiber optic cable 90; and (2) between the OD of the relevant portion of the boot 96 and the ID for the relevant portion of the passageway 142 of connector housing 140 that receives the boot 96 may both be selected as less than the clearance between the ID of the relevant portion of the boot passageway 96P and the OD of the relevant portion of the sleeve 80 received in the boot passageway 96P.

However, certain connector designs benefit from using a rigid material for boot 96, contrary to contrary to conventional boot designs that use flexible materials for inhibiting side-loading bending forces from impacting optical performance during cable bending. In this embodiment, boot 96 is formed from a polymer formed from a rigid material at room temperature (e.g., 20° C.). Using a rigid material for boot 96 allows the boot 96 to snap-fit into the connector housing 140 and cooperate with an outer housing 150 for optical terminal position assurance. Boot 96 formed form a rigid material may also provide features for inhibiting side-loading bending such as a reverse-funnel passageway at the rear end for influencing the side-bending radius of the fiber optic cable.

Figure 5:
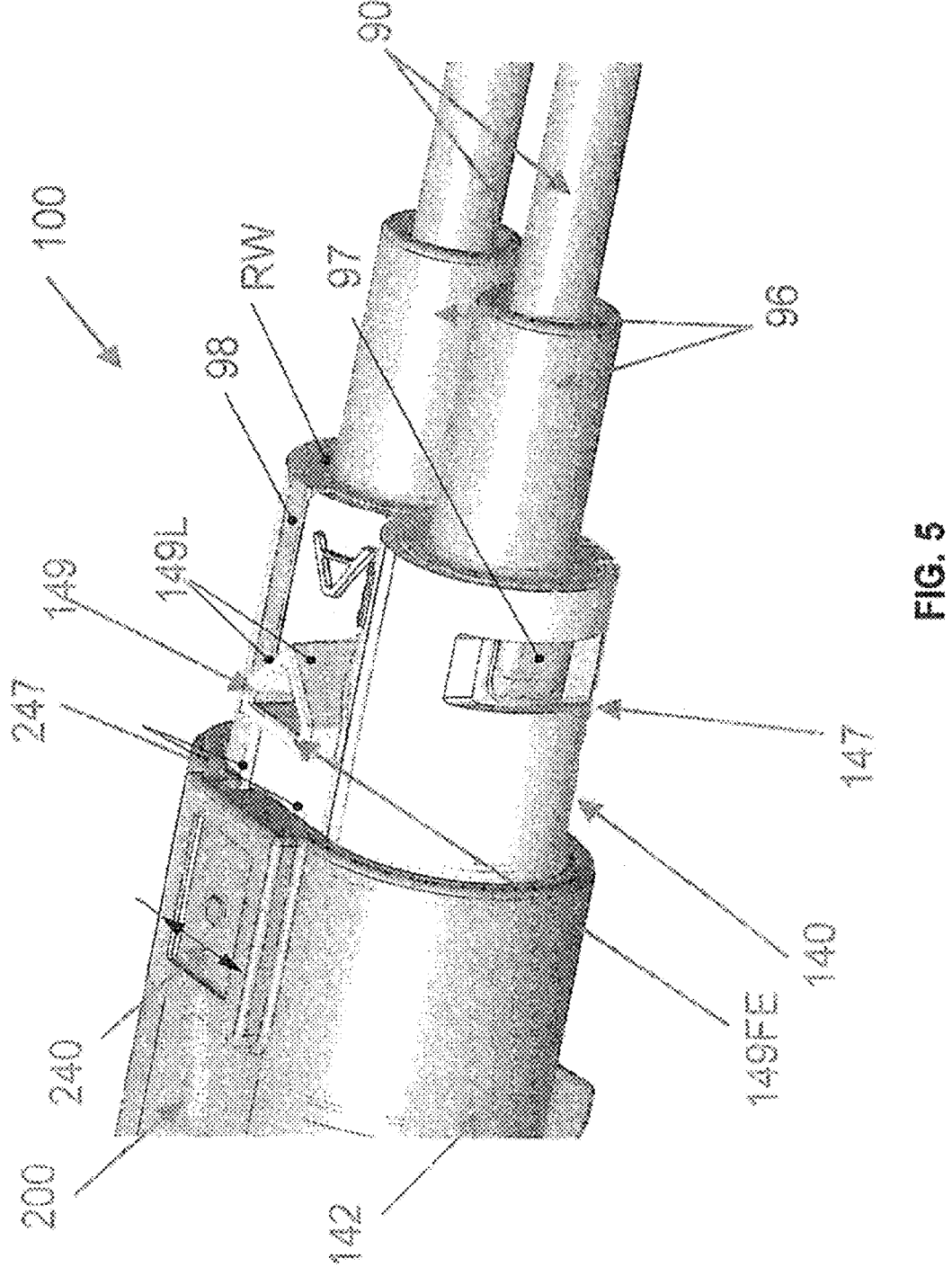
FIG. 5 is a top perspective view of an optical mating of the fiber optic connectors of FIG. 1 with the outer housing of the male plug shown in ghost lines for showing an explanatory optional keying arrangement for the fiber optic connectors.

Boots 96 may provide other features such as aiding in securing the optical terminal 105 in the connector housing 140. As shown in FIG. 5, boot 96 may also include an attachment feature 97 such as a protrusion for securing the boot 96 to the housing 140 by snap-fitting into window 147 formed in the connector housing 140 once the terminated ferrule assembly 60 is fully-inserted into the passageway 142 of the connector housing 140. Consequently, the optical terminal 105 is inhibited from being pulled-out of the connector housing 140. As depicted, the boot 96 may include one or more alignment features 98 such as a rail (i.e., longitudinal protrusion) or the like that cooperates with a cooperating alignment feature on the connector housing 140 such as a corresponding slot or the like. The alignment feature 98 may also act as a stop indicating full-insertion of the boot 96.

Returning to FIG. 1, connector 100 comprises any suitable outer housing 150. In the explanatory connector, the outer housing 150 has a latching trigger 152 disposed on the top side (i.e., second side) of the outer housing 150 for allowing the unmating of connector 100 from connector 200 when depressed as desired. Outer housing 150 also comprises a longitudinal open slot 150S extending from a front end 153 to a rear end 155 and disposed on a bottom side (i.e., first side) of the outer housing 150 as shown in FIG. 2. As shown, the longitudinal open slot 150S interrupts the circumferential hoop of outer housing 150, thereby allowing the assembly of the outer housing 150 to the connector 100 by passing the optical fiber or cable through the longitudinal open slot 150S for attachment to the connector 100 or removal of the outer housing 150. Outer housing 150 may engage a portion of a connector housing 140 for securing the outer housing 150 to connector 100 for assembly.

Latching trigger 152 may cooperate with structure on the connector housing 240 of a complimentary connector 200, thereby securing the optical mating between connectors 100,200 and providing a release that requires depressing of the latching trigger for unmating the connectors 100,200. The outer housing 150 may also include rails 154 on opposing side of the latching trigger 152 for inhibiting unintentional release of the optical mating between connectors. Other structures are also possible for securing the optical mating of connectors. Further, the outer housing 150 may have other structure such as a bridge 151 disposed on the front portion for protecting the latching trigger 152.

Returning to FIG. 2 details of the second side of connector 100 (i.e., the bottom side) as shown. As depicted, the connector housing 140 has features that cooperate with the outer housing 150 having a longitudinal open slot 150S. By way of explanation, outer housing may comprise one or more latch features 159 extending inward toward the longitudinal open slot 150S configured for engaging a protrusion 149 disposed on the connector housing 140. Latch features 159 may cooperate with the geometry of the protrusion 140 as desired for retention of the outer housing 150 when assembled. Latch features 159 of outer housing 150 or protrusion 149 of connector housing 140 may have any suitable geometry for allowing assembly or removal from the connector in a suitable fashion.

By way of example, the protrusion 149 of connector housing 140 may comprise a front end 149FE that is wider than a rear end 149RE, but other geometries are possible for the protrusion. In this instance, protrusion 149 has front end 149FE configured as a flat surface and rear end 149RE configured to converge to a smaller portion. For instance, the rear end 149RE may converge to a truncated end or to a point that is narrower that the front end 149FE as depicted in FIG. 2. As depicted, latch features 159 disposed on outer housing 150 cooperate with the connector housing 140 for assembly. For instance, latch features 159 of outer housing 150 cooperate with the protrusion 149 of connector housing 140 for positioning during assembly. Specifically, the front end 149FE of protrusion 149 aids in positioning the outer housing 150 for assembly by locating the latch features 159 forward of the front end 149FE of the protrusion 149 of the connector housing 140 (i.e., toward the mating interface side). Protrusion 149 may also include lead-in portions 149L if desired for aiding in the installation of the outer housing 150. The lead-in portions 149L of protrusion 149 depicted are angle surfaces that act as ramps for aligning and flexing open the outer housing 150 at the lead-in portions 159L of the latch features 159 for installation. Of course, other shapes and arrangements are possible for the protrusion 149 of connector housing 140 and cooperating latch features on the outer housing 150 of connector 100.

Figure 6:
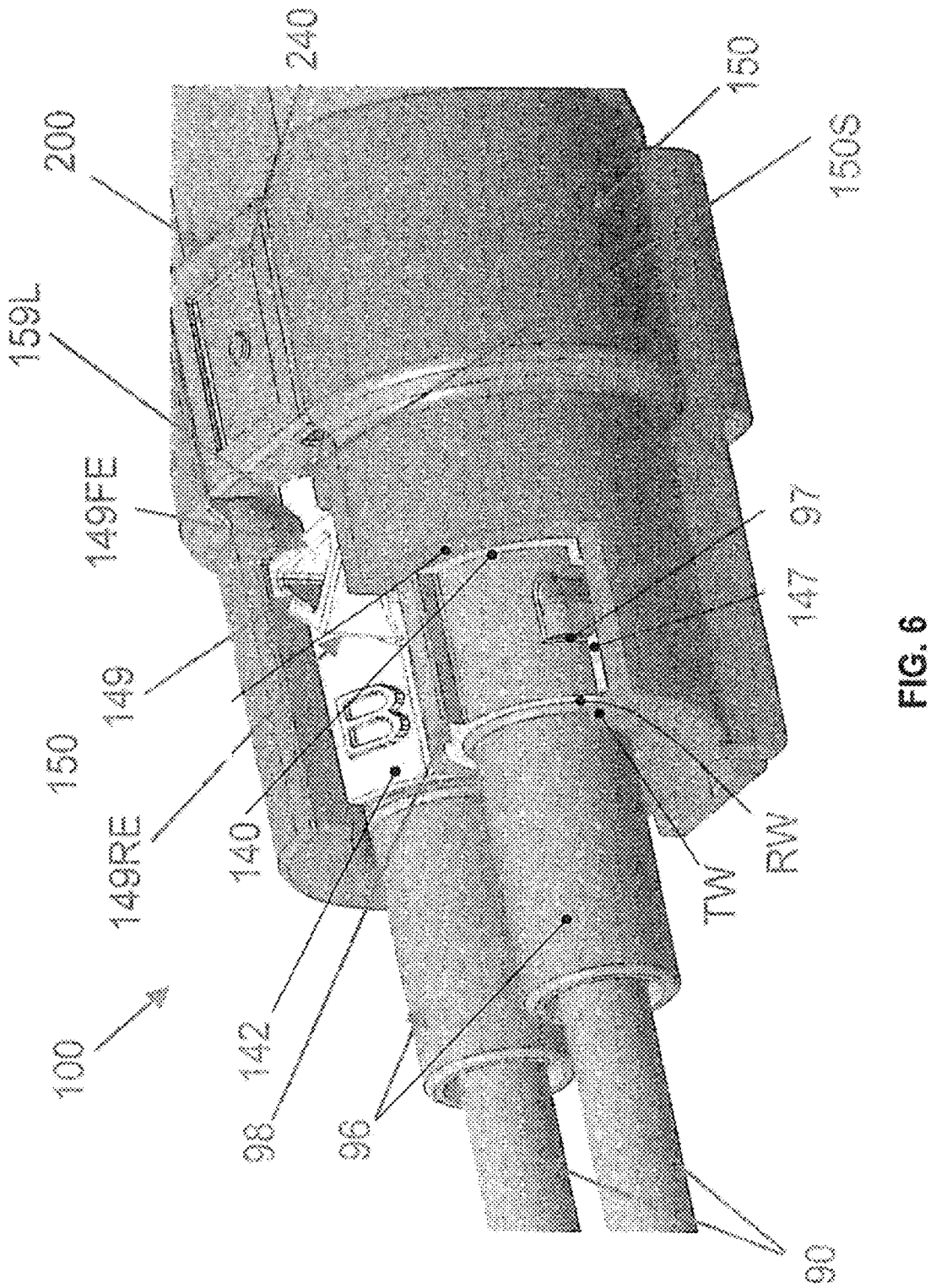
FIG. 6 is partial perspective sectional view of a representative optical mating of the fiber optic connectors similar to FIG. 1 showing the details for the cooperation between the outer housing and the other components of the fiber optic connector.

When the outer housing 150 is fully-seated on the connector housing 140 it positions other related geometry of the outer housing 150. Outer housing 150 also comprises a transverse wall (TW) for inhibiting optical terminals 105 from being displayed by excess rearward movement in the passageway 142 of the connector housing 140 when installed. Transverse wall (TW) of outer housing 150 acts to keep respective optical terminals 105 in the respective passageway 142 of the connector housing 140 at a desired longitudinal position for providing optical terminal position assurance (OTPA) when connector 100 is mated such as shown in FIG. 6. Consequently, the transverse wall (TW) inhibits respective optical terminals 105 from being displaced from the respective passageway 142 of connector housing 140. The transverse wall (TW) may cooperate with a suitable retaining wall (RW) for inhibiting ferrule assemblies 60 from being displaced from passageway 142. Retaining wall (RW) may be disposed on any suitable component for cooperating with the ferrule assemblies 60 such as on the boot 96.

With the longitudinal open slot 150S, the outer housing 150 has a generally c-shaped cross-section so it can flex during assembly or removal from the connector housing 140. Connector housing 140 provides a male plug configuration for connector 100 having a portion that fits within a passageway 242 of complimentary connector 200 for optical mating. Connector housing 140 provides a rigid body and can have other features for cooperating with outer housing 150.

By way of example, the outer housing 150 can have a front portion that is larger than the rear portion of the outer housing 150 that form a shoulder 150SH of the outer housing 150 if desired. Further, the longitudinal open slot 150S of the outer housing 150 may have a width that varies at different locations. By way of example, and not limitation, a first slot width 150SW1 may be larger than a second slot width 150SW2 for the outer housing 150 as desired. As depicted, the slot width at the forward portion of the outer housing 150 may be sized for cooperating with a portion 240W of the connector housing 240 for connector 200.

Connectors 100 disclosed herein may have still further advantageous features. As best shown in FIG. 2, connector 100 may comprise one or more keys for inhibiting optical mating with a non-compliant connector or device. As shown, connector housing 140 may comprise one or more keys 147 formed therein that are configured to cooperate with the counterpart features on complimentary connector 200 for limiting the optical mating of connector 100 to a suitable device or wiring scheme. The key 147 of connector may be disposed at any suitable location on the connector 100 and have a desired profile (i.e., male or female with the desired shape) for allowing mating with a compliant connection or device. As depicted, key 147 is a protruding key having a shape with a width, a height and a location for being received within a complimentary keyway of connector 200 that is appropriately sized and shaped. Variations in keying may include changing the width, the height and/or the location of the key on connector 100 for making distinct mating profiles for connector 100. Consequently, a wiring assembly or harness end could have two or more connectors 100 disposed on an end of the assembly with each connector 100 having a distinct keying profile adapted for mating with a distinct counterpart connector so that the connectors of the wiring assembly or harness only mate in the desired orientation with the counterpart assembly for eliminating errors in initial installation and any subsequent service.

FIG. 5 is a is a top perspective view of an optical mating of connector 100,200 with the outer housing 150 of the connector 100 shown in ghost lines for showing details of the connectors 100,200 when optically mated. As shown, a portion of the connector housing 140 is a male plug that fits within a passageway 242 of the complimentary connector 200 as shown. One or more keys may be used on the connector housing 140 for rotational alignment or providing features to ensure correct optical mating.

Illustratively, FIG. 5 shows an explanatory optional keying arrangement of the key 147 of connector 100 being aligned and inserted into the keying feature 247 of connector 200 that is configured as an appropriately sized slot with a given location that only allows optical mating with the desired complimentary connector 100. Thus, various different arrangements are possible for creating unique mating pairs of optical connectors as desired.

FIG. 6 is partial perspective sectional view of the optical mating of connectors 100,200 similar to FIG. 1 showing the details for the cooperation between the outer housing 150 and components of connector 100. As depicted, the transverse wall (TW) inhibits retaining wall (RW) from being displaced, thereby inhibiting optical terminals 105 from being displaced from passageway 142. In this instance, the retaining wall (RW) is disposed on a shoulder of boot 96, but the retaining wall could be disposed on other components such as disposed on the ferrule assembly 60 if the connector 100 did not use a boot 96. As best shown in FIG. 6, retaining wall (RW) disposed on the boot 96 is disposed generally flush with the rear end of the connector housing 140 when assembled. When assembled, the transverse wall (TW) of the outer housing 150 cooperates with the retaining wall (RW) for inhibiting undue displacement of the optical terminals 105. When the outer housing 150 is removed, it is possible to release and remove the respective boot 96 from the connector housing 140 if desired.

Figure 7:
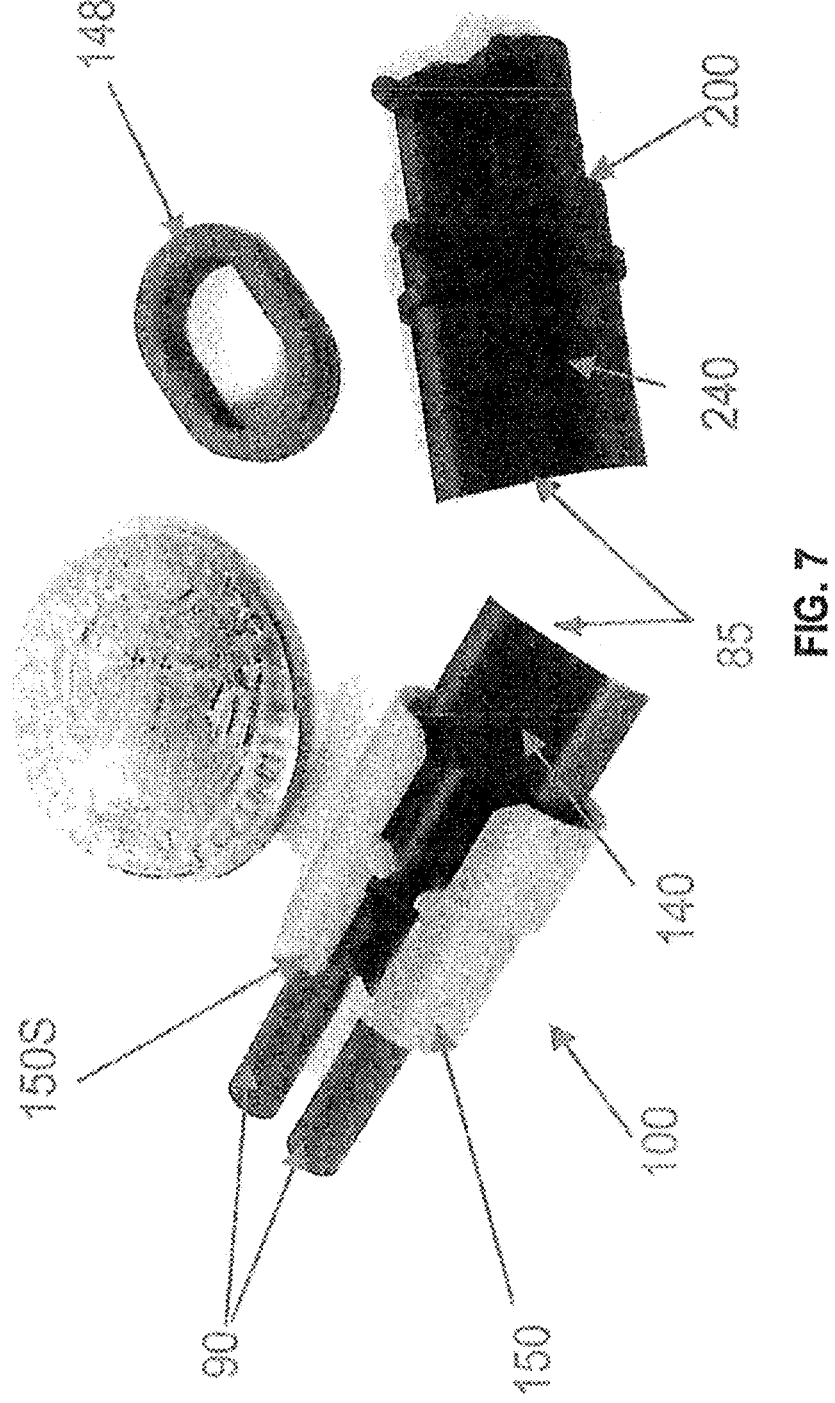
FIG. 7 is a perspective view of an explanatory fiber optic connector having an optional sealing membrane attached to a front end of the connector housing for inhibiting contaminants from reaching the optical interface prior to optical mating of the fiber optic connector.

FIG. 7 depicts the connector 100 having a sealing membrane 85 disposed about the opening on the front end 143 of the connector housing 140 for inhibiting contaminants from reaching the optical interface (e.g., the mating interface) prior to optical mating of connector 100. The sealing membrane 85 may be removed from the connector housing 140 for optical mating when desired. Sealing membrane 85 may be used with or without a dust cap on the ferrule assembly 60 as desired.

The connectors disclosed comprise a connector housing 140 where the optical interface of one or more ferrules or the like is disposed within the passageway 142 of the connector housing 140 and disposed rearward of the front end 143 so that a sealing membrane 85 may be disposed on the front end about a perimeter of the connector housing for inhibiting contaminants from reaching one or more ferrules of the connector.

The sealing membrane 85 may be attached to a perimeter of a connector housing in a suitable manner so that the sealing membrane 85 provide environmental protection while intact on the connector 100. The sealing membranes 85 disclosed are distinct from conventional dust caps since they are attached to the connector housing by swaging, adhesive or the like about a perimeter of the front end of the connector housing 140, thereby providing environmental protection until optical mating is desired. The sealing membrane concepts disclosed for fiber optic connectors also allow quick and easy removal and/or piercing of the sealing membrane 85 for optical mating of connector 100. For instance, the sealing membrane 85 may be removed from the connector housing 140 using one or more pull tabs on the sealing membrane 85 or the sealing membrane 85 may be pierced for providing access to the passageway 142 of the connector housing 140 for optical mating.

Generally speaking, the fiber optic connectors disclosed having the sealing membrane 85 provide a one-use sealing feature for the fiber optic connector such as for in-vehicle applications or the like, thereby advantageously providing a fiber optical connector with quick and easy removal of the sealing membrane 85 for building wiring harnesses without the need to dispose or maintain a dust cap in close proximity to the fiber optic connector for future use like the conventional fiber optic connectors. Moreover, the sealing membrane 85 of connector 100 may also remain intact until the wiring harness is placed into the vehicle, thereby providing flexibility for manufacture.

13

14

Figure 8:
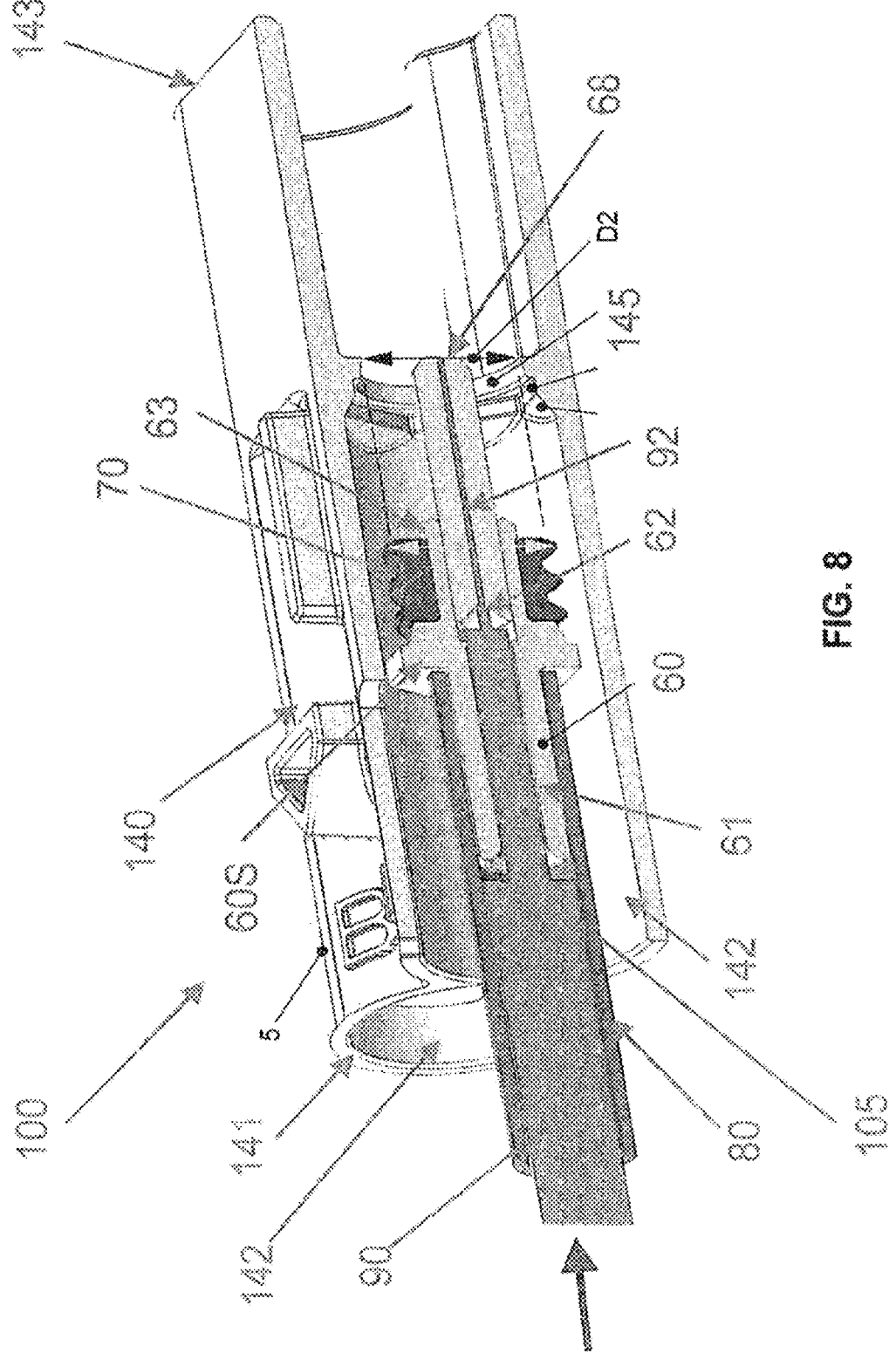
FIG. 8 is a partial perspective sectional view of the connector housing of the fiber optic connector of FIG. 1 showing the terminated ferrule assembly having an optional sealing gasket and a dust cap being inserted into a passageway of the connector housing of an explanatory connector.

As shown in FIG. 8, connector 100 comprises at least one optical terminal 105 for optical mating, and the ferrule assembly 60 comprises a bore 62 extending from a rear end 61 into the ferrule assembly 60 along with an optical interface 68 disposed at the front end of the ferrule assembly 60. An optical fiber 92 may be disposed within the bore 62 of the ferrule assembly.

The disclosed connectors may have other optional features. For example, connector 100 may further include an optional sealing gasket 70 is disposed about a portion of the ferrule assembly 60 for inhibiting contaminants from reaching the optical interface 68 of the ferrule assembly 60 when the connector 100 is mated. Each connectors 100 comprises a respective connector housing 140 for supporting the ferrule assembly.

Duplex connectors may comprise a second ferrule assembly 60 comprising a second sealing gasket 70 disposed on the second ferrule assembly 60 like the first ferrule assembly, thereby providing the sealing gasket 70 within the respective passageway. As depicted, sealing gasket 70 is disposed within the respective passageway(s) 142 of the connector housing 140 of connector 100. Thus, mated connectors according the concepts disclosed may create a sealing cavity within the passageway of the connector housing(s) when optically mated. The disclosed concepts provide a robust and reliable connector in a compact package that is quick and easy to assemble, manufacture, disconnect and reconnect as needed.

Connectors disclosed may also have still other structures or features as desired depending as desired. For instance, connectors 100 may further include a spring 67 for biasing the ferrule assembly 60 to a forward position for maintain a physical contact between ferrules or the like for mating at the optical interface 68; however, the concepts may be used without the need for a spring. Likewise, connector 200 may include a ferrule sleeve 89 for precisely aligning mating ferrule assemblies 60. As shown, ferrule sleeve 89 may be disposed in the passageway 242 of connector 200, and each ferrule assembly 60 of the connector has a dedicated ferrule sleeve 89 for precision alignment of mating of opposing ferrules.

The disclosed connectors may further include supplemental sealing if desired. For instance, a secondary seal may be disposed rearward of the sealing gasket 70 for the connectors. The secondary seal 84 is disposed on an outer surface of the respective boot 96, thereby providing respective secondary sealing cavities within the passageways 142 of the respective connector housing 140. The secondary seal may be formed by any suitable component such as an O-ring or other structure or feature as desired. In this embodiment, the forward portion of the boot 96 may comprise a suitable sized groove for seating the O-ring and providing the secondary sealing cavity with the inner wall of the connector housings 140.

As best shown in FIG. 8, ferrule assembly 60 comprises a rearward portion 61 and a forward portion 63. A shoulder 60S may be disposed between the rearward portion 61 and the forward portion 63 of the ferrule assembly 60, and the sealing gasket 70 is disposed on the forward portion 63 of the ferrule assembly 60. The shoulder 60S allows the sealing gasket 70 to be compressed when the connector 100,200 is mated for creating the sealing cavity when the connectors are optically mated.

Figure 9:
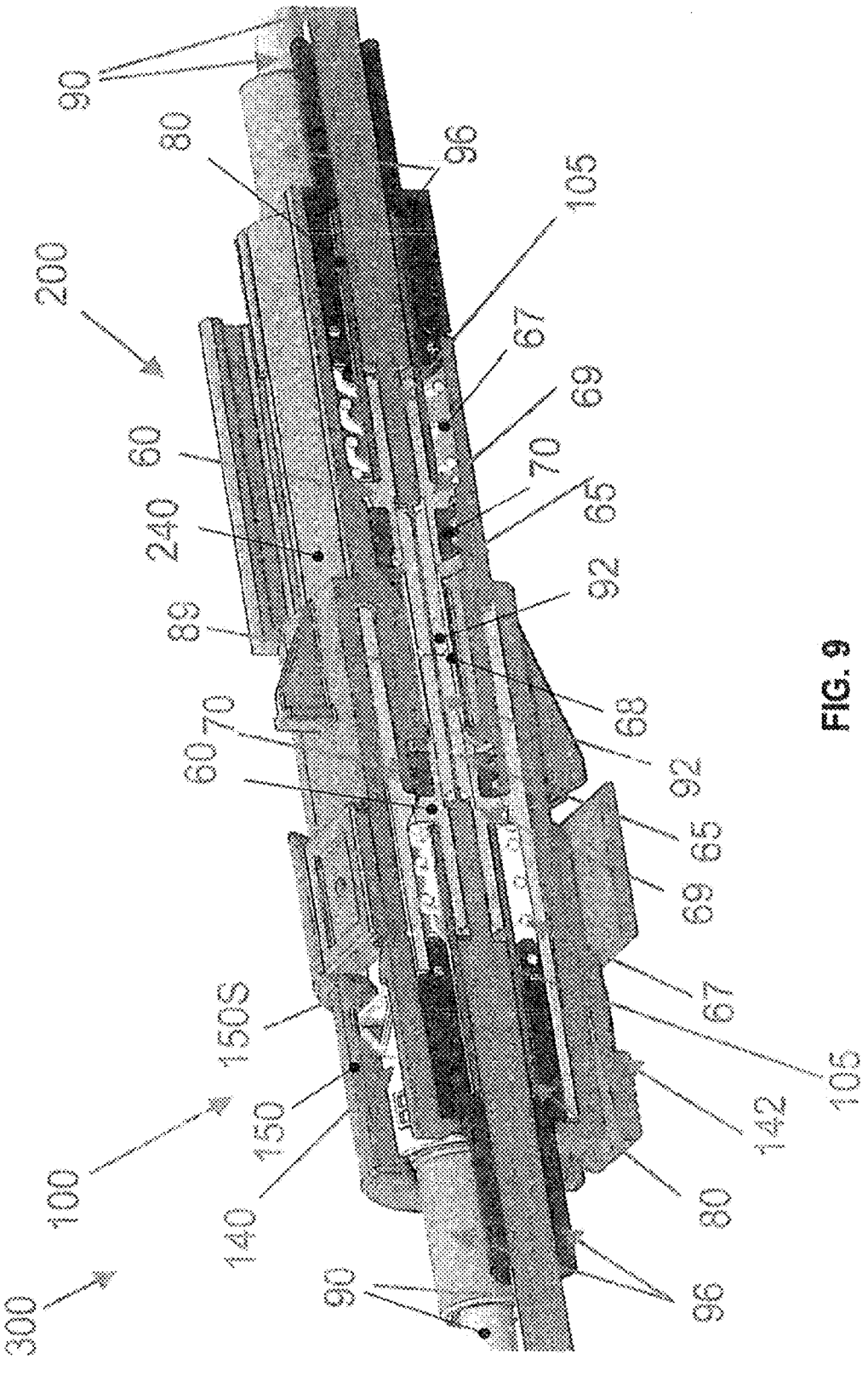
FIG. 9 depicts a cross-sectional view of the optical mating of the fiber optic connectors similar to FIGS. 1 and 8 configured as a male plug and female receptacle having respective ferrule assemblies with a sealing gasket disposed on the ferrule assemblies and within the passageway of the connector housing such as shown in FIG. 8.

FIGS. 8 and 9 depict sectionals view of connector 100 for showing features that may be used with the connector concepts disclosed. FIG. 8 depicts the insertion of the ferrule assembly 60 terminated to the fiber optic cable 90 as represented by the arrow at the rear of the fiber optic cable 90 during an assembly process, and FIG. 9 depicts an optically mated sectional view of connectors 100,200 configured with ferrule assemblies 60 having the optional sealing gasket 70 and spring 67.

The sealing gasket 70 may have a diameter D1 that is slightly larger than a diameter D2 of the opening of the housing at the internal wall 145 as depicted. The rear side of the opening at the internal wall 145 may have a tapered surface if desired.

Additionally, ferrule assembly 60 may have any suitable optical interface 68 desired. By way of explanation, the connectors 100,200 disclosed may have an optical interface 68 allows optical mating using physical contact or free-space coupling using a lens for the disclosed connectors. Lens-based configurations of connectors may also have the mating interface 68 in physical contact if desired. The ferrule assembly 60 may be configured for physical contact and comprises a ferrule 65 at least partially disposed in a ferrule holder 69 as depicted in FIG. 8. In this configuration, the ferrule holder 69 comprises a forward portion 69F and a rearward portion 69R with shoulder 60S disposed between the forward portion 60F and the rearward portion 69R with the ferrule 65 attached to the ferrule holder 69 to form the ferrule assembly 60. Thus, the bore 62 for the physical contact (PC) configurations extend from the rear end to the front end of the ferrule assembly 60 so the optical fiber 92 may extend to the optical interface 68 at the front end of the ferrule assembly 60 for optical mating with a complimentary mating optical fiber/ferrule assembly.

Alternatively, optical interface 68 of the ferrule assembly 60 for connector 100 may comprises a lens. If the ferrule assembly 60 has an optical interface configured as a lens the ferrule assembly 60 may be formed by a single component suitable for transmitting optical signals through the material of the ferrule assembly. In other lens-based configurations, the ferrule assembly 60 may comprise a suitable lens component disposed at the optical interface 68 of the ferrule assembly 60. In other words, the ferrule assembly 60 may have a lens molded-in as part of the ferrule assembly 60 or a separate lens may be attached at the end of the ferrule assembly 60. If ferrule assembly 60 is a lens-based configuration, then the bore 62 typically stops short of the optical interface 68 of the ferrule assembly 60 and the optical fiber 92 cooperates with the lens. If the optical interface 68 comprises a lens, the connector can be used without a spring. Fiber optic connector 100 may also use multi-fiber ferrules assemblies 60 if desired.

Like the other components, sealing gasket 70 may be formed from any suitable material and is preferably selected from a material that is compatible with the material of the connector and provides the desired performance over the intended operating parameters such as temperature, reliability and longevity. Sealing gasket 70 may comprises a silicone, a polybutylene terephthalate (PBT), a polymer material or a rubber material, but other suitable materials are possible. By way of explanation, a silicone material may be useful since it remains stable and pliable over a wide temperature range and/or compression forces. Additionally, the sealing gasket 70 is appropriately sized for providing the desired performance for sealing, compression, etc. Sealing gasket 70 may include one or more ridges 71 (i.e., one or more glands) for the desired performance. As shown, sealing gasket 70 has three ridges 71, but other suitable geometries are possible for the sealing gasket 70.

Any of the connectors 100 disclosed may be a portion of a cable assembly having one or more optical terminals 105 in the respective connectors 100,200. Further, the connectors 100 or cable assemblies disclosed may be used in any desired application. By way of example, the cable assemblies 300 may be a portion of a vehicle such as an automobile or the like with any suitable ferrule assembly count or arrangement such as single, duplex, triplex, quad, etc. For instance, a connector according to the concepts disclosed may have three ferrule assemblies arranged in a linear array as a triplex arrangement disposed within a suitable connector housing and outer housing as disclosed.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

I claim:

1. A fiber optic connector comprising:
a ferrule assembly comprising a bore extending from a rear end into the ferrule assembly, and an optical interface disposed at a front end of the ferrule assembly;
a fiber optic cable comprising an optical fiber and a jacket, wherein the optical fiber is disposed within the bore of the ferrule assembly;
a connector housing comprising a passageway extending from a rear end to a front end, wherein the ferrule assembly is at least partially disposed within the passageway;
a sleeve for strain-relieving the ferrule assembly to the fiber optic cable, wherein a first portion of the sleeve is attached to the ferrule assembly and a second portion of the sleeve is attached to the fiber optic cable for forming an optical terminal;
a boot comprising a front end sized for fitting into the passageway of the connector housing, and a boot passageway sized for receiving a portion of the sleeve; and
an outer housing comprising a longitudinal open slot extending from a front end to a rear end and disposed on a first side of the outer housing along with one or more latch features extending inward toward a longitudinal open slot on a first side of the outer housing with the one or more latching features being configured for engaging a protrusion disposed on the connector housing.

2. The fiber optic connector of claim 1, the boot comprising an attachment feature for cooperating with the connector housing for securing the optical terminal within the passageway of the connector housing.

3. The fiber optic connector of claim 1, further comprising a rear end of the outer housing comprising a transverse wall for inhibiting the boot and the at least one ferrule assembly from being displaced from the passageway of the connector housing.

4. The fiber optic connector of claim 1, wherein the connector housing comprises a key.

5. The fiber optic connector of claim 1, the outer housing further comprising a latching trigger disposed on a second side of the outer housing.

6. The fiber optic connector of claim 5, wherein the second side of the outer housing comprises a bridge for protecting a latching trigger.

7. The fiber optic connector of claim 1, wherein the protrusion of the connector housing comprises a front end that is wider than a rear end of the protrusion.

8. The fiber optic connector of claim 1, further comprising a sealing gasket disposed about a portion of the ferrule assembly for inhibiting contaminants from reaching the optical interface of the ferrule assembly when the fiber optic connector is mated.

9. The fiber optic connector of claim 8, wherein ferrule assembly comprises a forward portion and a rearward portion with a shoulder disposed between the forward portion and the rearward portion, and wherein the sealing gasket is disposed on the forward portion of the ferrule assembly.

10. The fiber optic connector of claim 8, further comprising a second ferrule assembly with a second sealing gasket disposed on the second ferrule assembly received within a second passageway of the connector housing.

11. The fiber optic connector of claim 8, further comprising a secondary seal disposed rearward of the sealing gasket.

12. The fiber optic connector of claim 8, wherein the optical interface comprises a lens.

13. The fiber optic connector of claim 8, wherein the at least one ferrule assembly comprises a ferrule that defines the optical interface and is configured for optically mating using physical contact.

14. The fiber optic connector of claim 8, wherein the sealing gasket is disposed within the passageway of the connector housing.

15. The optical terminal of claim 1, the optical terminal further comprising a cavity disposed between the ferrule assembly and the front end of the jacket, wherein the cavity has a length of 5 millimeters or less.

16. The fiber optic connector of claim 1, wherein the fiber optic connector is a portion of a cable assembly.

17. A fiber optic connector comprising:
a ferrule comprising a bore extending from a rear end into the ferrule, and an optical interface disposed at a front end of the ferrule;
a ferrule holder comprising a forward portion and a rearward portion with a shoulder disposed between the forward portion and the rearward portion, and wherein the ferrule is attached to the ferrule holder to form a ferrule assembly;
a fiber optic cable comprising an optical fiber and a jacket, wherein the optical fiber is disposed within the bore of the ferrule;
a connector housing comprising a passageway extending from a rear end to a front end, wherein the ferrule assembly is at least partially disposed within the passageway;
a sleeve for strain-relieving the at least one ferrule assembly to the fiber optic cable, wherein a first portion of the sleeve is attached to the ferrule assembly and a second portion of the sleeve is attached to the fiber optic cable for forming an optical terminal;
a boot comprising a front end sized for fitting into the passageway of the connector housing, and a boot passageway sized for receiving a portion of the sleeve; and an outer housing comprising a rear end with a transverse wall for inhibiting the boot and at least one ferrule assembly from being displaced from the passageway of the connector housing.

18. The fiber optic connector of claim 17, the boot comprising an attachment feature for cooperating with the connector housing for securing the optical terminal within the passageway of the connector housing.

19. The fiber optic connector of claim 17, wherein the connector housing comprises a key.

20. The fiber optic connector of claim 17, wherein the outer housing comprises a longitudinal open slot extending from a front end to a rear end and disposed on a first side of the outer housing along with one or more latch features extending inward toward a longitudinal open slot on a first side of the outer housing with the one or more latching features being configured for engaging a protrusion disposed on the connector housing.

21. The fiber optic connector of claim 20, the outer housing further comprising a latching trigger disposed on a second side of the outer housing.

22. The fiber optic connector of claim 20, wherein the protrusion of the connector housing comprises a front end that is wider than a rear end of the protrusion.

23. The fiber optic connector of claim 17, further comprising a sealing gasket disposed about a portion of the ferrule assembly for inhibiting contaminants from reaching the optical interface of the ferrule assembly when the fiber optic connector is mated.

24. The fiber optic connector of claim 23, wherein ferrule assembly comprises a forward portion and a rearward portion with a shoulder disposed between the forward portion and the rearward portion, and wherein the sealing gasket is disposed on the forward portion of the ferrule assembly.

25. The fiber optic connector of claim 23, further comprising a second ferrule assembly with a second sealing gasket disposed on the second ferrule assembly received within a second passageway of the connector housing.

26. The fiber optic connector of claim 23, further comprising a secondary seal disposed rearward of the sealing gasket.

27. The fiber optic connector of claim 17, wherein the optical interface comprises a lens.

28. The fiber optic connector of claim 17, wherein the at least one ferrule assembly comprises a ferrule that defines the optical interface and is configured for optically mating using physical contact.

29. The fiber optic connector of claim 23, wherein the sealing gasket is disposed within the passageway of the connector housing.

30. The optical terminal of claim 17, the optical terminal further comprising a cavity disposed between the ferrule assembly and the front end of the jacket, wherein the cavity has a length of 5 millimeters or less.

31. The fiber optic connector of claim 17, wherein the fiber optic connector is a portion of a cable assembly.

32. A method of making a fiber optic connector comprising:

assembling a ferrule into a ferrule holder to form a ferrule assembly, wherein the ferrule comprises a bore extending from a rear end into the ferrule, and an optical interface disposed at a front end of the ferrule;

placing an optical fiber within the bore of the ferrule, wherein the optical fiber is a portion of a fiber optic cable comprising a jacket;

using a sleeve to strain-relieve the ferrule assembly to the fiber optic cable with a first portion of the sleeve attached to the ferrule assembly and a second portion of the sleeve attached to the fiber optic cable;

inserting the ferrule assembly into a passageway of a connector housing that extends from a rear end to a front end of the connector housing so that the ferrule assembly is at least partially disposed within the passageway;

inserting a boot comprising a front end sized for fitting into the passageway of the connector housing so that a boot passageway receives a portion of the sleeve; and placing an outer housing about the connector housing, wherein the outer housing comprises a longitudinal open slot extending from a front end to a rear end and disposed on a first side of the outer housing along with one or more latch features extending inward toward a longitudinal open slot on a first side of the outer housing with the one or more latching features being configured for engaging a protrusion disposed on the connector housing.

33. The method of claim 32, the outer housing further comprising a rear end having a transverse wall for inhibiting the boot and the optical terminal from being displaced from the passageway of the connector housing.

34. The method of claim 32, further comprising positioning a sealing gasket about a portion of the ferrule assembly for inhibiting contaminants from reaching the optical interface of the ferrule when the fiber optic connector is mated.

35. The method of claim 34, wherein the ferrule holder comprises a forward portion and a rearward portion with a shoulder disposed between the forward portion and the rearward portion of the ferrule holder, and wherein the sealing gasket is positioned on the forward portion of the ferrule holder.

36. The method of claim 32, further comprising the step of forming a second ferrule assembly and positioning a second sealing gasket on the second ferrule assembly, and inserting the second ferrule assembly into the passageway of the connector housing so that the second ferrule assembly is at least partially disposed within the passageway of the connector housing.

37. The method of claim 32, further comprising positioning a secondary seal disposed rearward of the sealing gasket.

38. The method of claim 32, wherein the optical interface comprises a lens or is defined by one or more ferrules that optically mate using physical contact.

39. The method of claim 32, wherein a sealing gasket is disposed within the passageway of the connector housing.

40. The method of claim 32, wherein the fiber optic connector is a portion of a cable assembly.

* * * * *